(12) United States Patent
Moreno et al.

(10) Patent No.: US 9,103,485 B2
(45) Date of Patent: Aug. 11, 2015

(54) COMPOSITE ISOLATION BEARINGS

(75) Inventors: Gil A. Moreno, San Clemente, CA (US); Don A. Hubbard, Valencia, CA (US)

(73) Assignee: WORKSAFE TECHNOLOGIES, Valencia, CA (US)

( * ) Notice: Subject to any disclaimer, the term of this patent is extended or adjusted under 35 U.S.C. 154(b) by 202 days.

(21) Appl. No.: 13/582,391

(22) PCT Filed: Mar. 4, 2010

(86) PCT No.: PCT/US2010/026259
§ 371 (c)(1),
(2), (4) Date: Sep. 25, 2012

(87) PCT Pub. No.: WO2011/109021
PCT Pub. Date: Sep. 9, 2011

(65) Prior Publication Data
US 2013/0119224 A1 May 16, 2013

Related U.S. Application Data (60) Provisional application No. 61/310,599, filed on Mar. 4, 2010.

(51) Int. Cl.
| | | |
|---|---|---|
| *F16M 13/00* | (2006.01) |
| *F16M 13/02* | (2006.01) |
| *E04H 9/02* | (2006.01) |
| *E01D 19/04* | (2006.01) |

(52) U.S. Cl.
CPC ............. *F16M 13/02* (2013.01); *E01D 19/043* (2013.01); *E04H 9/023* (2013.01)

(58) Field of Classification Search
USPC ............... 248/583, 580, 346.01, 346.05, 694; 52/167.6, 167.8, 263, 167.5, 167.1; 384/36, 25, 50, 618
See application file for complete search history.

(56) References Cited

U.S. PATENT DOCUMENTS

| | | | | |
|---|---|---|---|---|
| 951,028 | A * | 3/1910 | Schar | 52/167.5 |
| 2,014,643 | A * | 9/1935 | Bakker | 384/49 |
| 4,974,378 | A * | 12/1990 | Shustov | 52/167.5 |
| 5,261,200 | A * | 11/1993 | Sasaki et al. | 52/167.5 |
| 5,558,191 | A * | 9/1996 | Lai | 188/379 |
| 5,599,106 | A | 2/1997 | Kemeny | |
| 6,321,492 | B1 * | 11/2001 | Robinson | 52/167.1 |
| 6,505,806 | B1 * | 1/2003 | Glaesener | 248/638 |
| 6,955,467 | B2 * | 10/2005 | Chang et al. | 384/25 |
| 6,971,795 | B2 * | 12/2005 | Lee et al. | 384/36 |
| 7,290,375 | B2 | 11/2007 | Kemeny | |
| 7,325,792 | B2 * | 2/2008 | Siino et al. | 267/33 |
| 7,547,142 | B2 * | 6/2009 | Robinson et al. | 384/36 |
| 7,743,882 | B2 * | 6/2010 | Vu | 181/209 |
| 7,784,225 | B2 | 8/2010 | Kemeny | |
| 8,011,142 | B2 * | 9/2011 | Marioni | 52/167.4 |
| 8,104,236 | B2 * | 1/2012 | Kemeny | 52/167.5 |
| 8,156,696 | B2 | 4/2012 | Hubbard et al. | |
| 8,342,752 | B2 | 1/2013 | Moreno et al. | |
| 8,484,911 | B2 * | 7/2013 | Zayas et al. | 52/167.5 |

(Continued)

*Primary Examiner* — Monica Millner
(74) *Attorney, Agent, or Firm* — Stout, Uxa & Buyan, LLP; Carlos A. Fisher (57) ABSTRACT

Improved isolation bearings, platforms, and tracks are disclosed for protecting a payload, such as delicate equipment, from damage due to vibrations, such as seismic vibrations. The isolation platforms and bearings combine a plurality of shapes on their load bearing surfaces to increase stability of the payload even when subjected to vibrations of high velocity or intensity.

19 Claims, 3 Drawing Sheets

(56) References Cited

U.S. PATENT DOCUMENTS

| | | |
|---|---|---|
| 8,511,004 B2 * | 8/2013 | Hubbard et al. .............. 52/167.5 |
| 8,745,934 B2 * | 6/2014 | Kemeny ........................ 52/167.5 |
| 2002/0166296 A1 * | 11/2002 | Kim ............................. 52/167.5 |
| 2004/0262487 A1 * | 12/2004 | Kawashima et al. ......... 248/638 |
| 2005/0100253 A1 * | 5/2005 | Chang et al. ................... 384/36 |
| 2005/0241245 A1 * | 11/2005 | Tsai ............................. 52/167.1 |
| 2006/0054767 A1 * | 3/2006 | Kemeny ................... 248/346.01 |
| 2006/0191213 A1 * | 8/2006 | Kemeny ........................ 52/167.1 |
| 2006/0260221 A1 * | 11/2006 | Kemeny ........................ 52/167.5 |
| 2007/0261323 A1 * | 11/2007 | Hubbard et al. .............. 52/167.6 |
| 2008/0066398 A1 * | 3/2008 | Tubota .......................... 52/167.5 |
| 2011/0072739 A1 * | 3/2011 | Moreno et al. ............... 52/167.5 |
| 2011/0222800 A1 | 9/2011 | Hubbard et al. |
| 2012/0222369 A1 | 9/2012 | Kemeny |
| 2012/0266558 A1 * | 10/2012 | Hubbard et al. .............. 52/741.3 |

\* cited by examiner

COMPOSITE ISOLATION BEARINGS

This is a 371 of international patent application PCT/US2010/026259, filed Mar. 4, 2010, which claimed priority to U.S. provisional patent application 61/310,599, filed Mar. 4, 2010.

FIELD OF THE INVENTION

The present invention relates, generally, to isolation bearings, such as seismic and isolation bearings utilizing a rolling sphere or hardened ball on a bearing surface. In one specific embodiment, the invention relates to an isolation bearing in which the load or a portion thereof is concentrated on one or more rolling sphere or hardened ball placed between bearing surfaces, at least one of which is indented and has a cross-section comprising at least one of an arc, a constant slope, or a parabola and at least one additional shape. The invention is useful in the field of structural support and seismic stabilization, such as for buildings, bridges, and other large edifices. In other aspects, the invention is useful for supporting and stabilizing equipment, such as laboratory, computer, and other valuable equipment from vibrations, such as seismic vibrations, which might otherwise damage such equipment.

SUMMARY OF THE INVENTION

Isolation bearings are used with, for example, bridges, buildings, computers, machines, delicate and/or dangerous equipment, and the like (hereinafter "structures") to protect these structures from damage due to seismic phenomena. The isolation bearings (and platforms and floors containing such isolation bearings) are typically configured to support a specific load, i.e., the weight of the structure being supported. In this regard, it is desirable that a particular seismic isolation bearing be restrained in order to prevent failure of the bearing or instability of the structure being supported.

The conservative character of a seismic isolation bearing may be described in terms of the bearing's ability to absorb displacement energy caused by seismic activity or other external applied forces, and thus to cushion the structure being supported from such displacement. In this regard, features such as a rubber bearing body, leaf spring, coil spring, or the like may be employed to urge the bearing back to its original, nominal position following a lateral displacement caused by an externally applied force such as a seismic tremor. In this context, the bearing "conserves" lateral displacement energy by storing a substantial portion of the applied energy in its spring, rubber volume, or the like, and releases this stored energy upon cessation of the externally applied force to pull or otherwise urge the bearing back to its nominal original position.

Certain isolation bearings may have a laminated rubber bearing body, reinforced with steel plates. More particularly, thin steel plates are interposed between relatively thick rubber plates, to produce an alternating steel/rubber laminated bearing body. The use of a thin steel plate between each rubber plate in the stack helps prevent the rubber from bulging outwardly at its perimeter in response to applied vertical bearing stresses. This arrangement permits the bearing body to support vertical forces much greater than would otherwise be supportable by an equal volume of rubber without the use of steel plates.

Other isolation bearings may comprise steel coil springs combined with snubbers (i.e., shock absorbers). These bearings are often used to vertically support the weight of the structure; such bearings may be most suitable for the support of apparatus and machines. Coil springs, described in International Patent Publication WO 2004/007871, are generally preferable to steel/rubber laminates in applications where the structure to be supported may undergo an upward vertical force, which might otherwise tend to separate the steel/rubber laminate. Rubber bearings are typically constructed of high damping rubber, or are otherwise supplemented with lead or steel yielders useful in dissipating applied energy.

Metallic yielders, however, are disadvantageous in that they inhibit or even prevent effective vertical isolation, particularly in assemblies wherein the metallic yielder is connected to both an upper bearing plate and an oppositely disposed lower bearing plate within which the rubber bearing body is sandwiched.

Steel spring mounts of the type typically used in conjunction with apparatus and machines are generally unable to provide adequate energy dissipation, with the effect that such steel spring mounts generally result in wide bearing movements. Such wide bearing movements may be compensated for through the use of snubbers or shock absorbers to aid in absorbing the energy of the lateral displacement. However, in use, the snubber may impart to the bearing an acceleration on the order of, or even greater than, the acceleration applied to the machine due to seismic activity.

Another example of an isolation bearing is one using a rolling, approximately spherical, rigid ball placed between rigid load-bearing plates. It will be understood that such a rigid ball may itself be referred to as a bearing (such as a ball bearing), or the combination of the rigid ball and the supporting rigid plates may together be referred to as a bearing. In this description generally the word "bearing" shall be reserved for the entire assembly; however, in certain occasions the context may make clear that the ball itself is referred to as a bearing, such as through the use of terms such as "ball bearing", "rolling bearing" or "spherical bearing".

For example, one isolation bearing comprises a lower plate having a conical-shaped cavity and an upper plate having a substantially identical cavity with a rigid ball-shaped bearing placed therebetween. Such a bearing is often known as a ball-in-cone type bearing. See e.g., Kemeny, U.S. Pat. No. 5,599,106.

In another example, an isolation bearing comprises a lower plate having a spherical shaped cavity and an upper plate having a substantially identical cavity with a rigid ball-shaped bearing placed therebetween.

In yet another example, such a device includes a bearing comprising a lower plate having a parabolic shaped cavity and an upper plate having a substantially identical cavity with a rigid ball-shaped bearing placed therebetween.

Isolation platforms containing a variety of differently shaped load bearing surfaces bearings are disclosed in e.g., International Patent Publication No. WO/2004/007871 and US 2006/0054767; Isolation platforms comprising floors are disclosed in e.g., U.S. Pat. No. 7,290,375. Each of these publications and patents, and every other patent, patent application, and publication cited in this patent application, is expressly and individually incorporated by reference herein in its entirety as part of this specification.

Isolation bearings of the "rolling ball" type may in general include a lower plate having, without limitation, a wholly or partially conical, spherical or parabolic shaped cavity, a cavity having a constant slope, and/or a cavity that is a combination of two or more of these shapes and, an upper plate which may be identical or different to the lower plate, with a rigid ball shaped bearing placed therebetween. The lower plate rests or is fixed or placed on the ground, foundation, platform, support, or base surface, while the structure to be supported rests on the top surface of the upper plate, or the platform or surface which is held up by the isolator bearing or bearings. In this way, when external vibrations such as seismic movements occur the lower plate moves relative to the upper plate via the rolling of the spherical ball between the upper and lower plates. The structure supported is thus isolated from the external vibrations.

However, such devices are not without their own drawbacks. For example, depending on the size of the seismic vibration, the bearings may have a limited range of mobility, and thus be able to absorb and dissipate a limited severity of seismic shock before becoming ineffective. For example, the maximum amount of lateral displacement of the upper and lower plates relative to each other may be limited based on the size of the bearing or of the surrounding structure. Also, in isolation bearings and platforms containing rolling balls, a severe shock such as that caused by a strong seismic tremor, can cause such severe lateral displacement that the ball is ejected from the bearing, causing failure of the bearing.

There is a need for isolation bearings that are stable (i.e., have a reduced tendency to come apart), can withstand and absorb large seismic shocks, and which are easily integrated into the locations in which they are desired to be installed. There is also need for isolation bearing structures that have reduced susceptibility to resonance or harmonic interactions between bearings, spheres, and bearing surfaces during a vibration. Such interactions may be caused when bearing surfaces are discontinuous (for example in which the load-bearing surface has radial grooves or crests) or when, for example, a central apex is too deep. In such structures, when the bearing is subject to a strong vibration, the spheres may "bounce" in and out of the apex, over or through the groove or ridge, or cause a shaking of the bearing when it interacts with other isolation bearings in, for example, an isolation platform.

Isolation bearing stability may be improved by factors including increasing the size of the bearing plate or plates, by increasing the depth of the indentation on the bearing surface of one or more bearing plate, and/or by varying the shape of the bearing surface.

With regard to this last parameter, for a substantially symmetrical load-bearing surface (for example in the ball-in-cone bearing disclosed in Kemeny, U.S. Pat. No. 5,599,106), one can draw a straight line segment extending from the center of the indentation to the perimeter of the bearing surface. For the lower load-bearing surface of a ball-in-cone bearing as disclosed in the '106 patent, the shape of this line (one of an infinite number of such lines which can be drawn from the apex to the base of a cone) when shifted to a cross-sectional plane, describes the hypotenuse of a right triangle whose other sides include the bottom of the bearing (parallel to the ground or floor surface), and the side of the bearing, defining the height from the center of the bearing to the highest point near the perimeter of the bearing reached during use by the rolling sphere. In a preferred embodiment, the upper load-bearing surface of the bearing may be identical to the load-bearing surface, but have an inverted orientation.

The geometry of the load-bearing surface is of particular relevance when considering the forces acting upon the bearing during and after it is subjected to a vibration, such as a seismic vibration.

The ball-in-cone bearing may be used as an initial (and non-limiting) illustration of the relation of geometry and the physical principles at play in rolling ball isolation bearings. Since the ball rests between the upper and lower load-bearing surfaces, and in certain cases may rest in central apices or depressions of one or both such bearing surface, upon the application of a lateral force, such as a seismic shock, to the bearing there may be some initial resistance to displacement of the ball from these depressions. The resistance may be sufficient to prevent any substantial displacement of the two bearing surfaces with respect to each other if the applied lateral force is small enough. Thus, where present, the spherical shape of the central apices provides an initial restoring force urging the ball to remain within the central apex. This restoring force is identical regardless of the direction from which the lateral force is applied.

Regardless whether the bearing possesses central apices or not, if the initial lateral force is great enough, the plates of the bearing will be moved relative to one another by the applied force through the action of the rolling ball. This means that the applied lateral force is strong enough to force the ball along the conical recessed surface. This requires that either the upper bearing surface or the ball (or both) move "uphill" against the force of gravity and the mass of the load placed on the upper plate of the claimed platform. Therefore, the lateral force is temporarily partially stored as vertical "potential energy".

Once the ball is located on the recessed bearing surface, the physics are similar to those concerning an object placed on an inclined plane, since in a ball-in-cone bearing the recessed bearing surface has constant slope. For simplicity, FIG. 1 examines primarily the lower recessed surface and the ball, with the understanding that similar principles apply (although in mirror image) to the upper recessed surface, which "floats" upon and is supported by the rolling ball.

Figure 1:
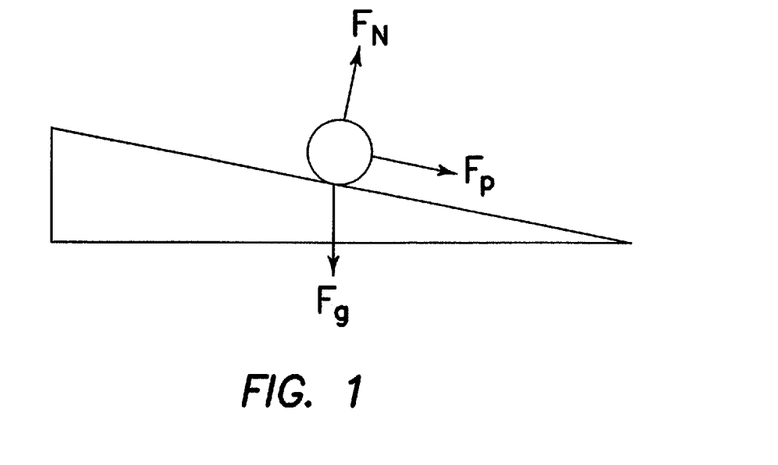
FIG. 1 is a drawing showing the force vectors upon a rolling ball on an inclined plane.

Thus, with reference to FIG. 1, $F_g$ equals mg, where m is the combined mass of the ball and the load transferred upon the ball by the upper plate, and g is gravitational acceleration (9.81 m/s$^2$). Although $F_g$ is exerted downwards, on the inclined plane, $F_g$ is comprised of two vectors: $F_N$ (the normal force extending perpendicular to the surface of the plane) and $F_p$. Due to the shape of the ball, the force opposing $F_p$ ($F_f$; the frictional force) is minimal and therefore disregarded in this diagram.

The magnitude of each of the vectors $F_p$ and $F_N$ is dictated by the angle of the inclined slope and the magnitude of $F_g$, and can be calculated geometrically from the Pythagorean theorem, where $F_g^2 = F_N^2 + F_p^2$. Thus, $F_p$ is a constant, so long as the angle between the recessed surface and the horizon is also constant.

Therefore, once the lateral motion has caused the ball to displace onto either or both the upper or lower recessed bearing surface, $F_p$, the "restoring force" is constant because of the conical nature of the ball-in-cone surface.

With this explanation, it can now be seen that if the bearing surface has a different cross-sectional shape (e.g., a shape of a spherical curve) such that vertical displacement as a function of lateral displacement is not constant, the magnitude of the restoring force $F_p$ as a function of lateral distance traveled by the rolling ball is also not constant. For example, imagine for a moment that the cross-section of the bearing surface is a spherical curve rather than conical. In such a bearing a radius through the center of the bearing surface to the perimeter of the bearing surface viewed in cross section would yield a non-constant, curved slope. Thus, a restoring force $F_p$ would not be constant if the recessed surface were spherical. Rather, the restoring force (and vertical distance traveled) would increase as a function of the distance the ball travels from the center of the bearing (i.e., toward the perimeter of the bearing surface, where the steepness of the slope of the curve increases). In a spherical curve, the rate of change of the restoring force is constant, but not the restoring force itself. Thus, with each unit of lateral distance traveled from the center of the bearing surface, the greater the vertical distance traveled and the greater the restoring force.

Other simple planar open curves (such as various parabolic or other concave curves) have the same basic character as the spherical curve, so that as the ball moves from the center of the bearing towards the perimeter of the bearing surface the change in vertical displacement as a function of lateral distance traveled increases at different non-constant rates depending upon the shape of the curve.

In the present invention it has been surprisingly found that an optimal configuration for the load-bearing surface of a rolling ball isolation bearing, particularly when the isolation bearing is subjected to a strenuous vibration and is used in conjunction with other isolation bearings (such as in an isolation platform, track, or floor), is a combination of more than one shape. In a preferred embodiment, when viewed in cross section, at least one of the upper or lower load-bearing surface has an enlarged concave indentation at the center, with a border around the perimeter of the bearing comprising a region of constant slope, as in a conical bearing.

In another preferred embodiment, the present inventors have discovered that a rolling ball isolation bearing tends to perform more robustly, and will less disruptive harmonic resonance if either or both lead-bearing surfaces lack a central spherical depression of the approximate diameter of the rolling ball, or have a very shallow depression in the center.

Preferably the shapes of the curve and angle of the cross section of each load-bearing surface or "dish" are such that regardless of the input shear acceleration caused by the seismic event, the output is limited to a maximum acceleration. For example, in one embodiment of the invention, the output acceleration may be limited by the combined curve and angle of the dish to about 0.1 g or less, even when the input shear is about 0.3 g, or about 0.35 g, or about 0.4 g, or about 0.5 g, or about 0.6 g, or about 0.7 g, or about 0.8 g, or about 0.9 g, or about 1.0 g or more.

In another embodiment the output acceleration may be limited by the combined curve and angle of the dish to about 0.8 g or less, even when the input shear is about 0.3 g, or about 0.35 g, or about 0.4 g, about 0.5 g, or about 0.6 g, or about 0.7 g, or about 0.8 g, or about 0.9 g, or about 1.0 g or more.

In another embodiment the output acceleration may be limited by the combined curve and angle of the dish to about 0.75 g or less, even when the input shear is about 0.3 g, or about 0.35 g, or about 0.4 g, or about 0.5 g, or about 0.6 g, or about 0.7 g, or about 0.8 g, or about 0.9 g, or about 1.0 g or more.

The attenuation of the input shear forces are a function of the base shear input. Thus, the percentage attenuation can be up to about 66%, or up to about 71%, or up to about 75%, or up to about 80%, or up to about 83%, or up to about 86%, or up to about 88%, or up to about 90% or more.

It will be understood that the ranges of input shear, output shear and percentage attenuation presented above specifically disclose, and are intended to specifically disclose, all points between any two maximum and minimum values listed and any range from a value greater than 0 and up to any such maximum value listed.

Generally, in accordance with various embodiments of the present invention, the bearings of the present invention, or platforms, floors or instruments made using such bearings may comprise upper or isolator plates or "dishes", and lower or bearing plates or "dishes", having a combination of two or more different cross-sectional shapes, such as, without limitation, conical depressions, spherical depressions, and/or parabolic depressions. In a preferred configuration, the load-bearing surfaces of the dishes do not comprise ridges or depressions radiating substantially from the center of the dish to the perimeter of the dish or in any other direction, although there may be annular concentric regions of discontinuity between cross-sectional shapes.

Preferably, although not necessarily, the upper plate and lower plate are substantially alike, or identical, in their opposing surfaces. In such isolation bearings or platforms the upper plate supports the one or more loads, and the lower plate directly or indirectly contacts the floor, foundation, surface or area below the bearing or platform. Between the upper and lower plates or pans, one or more rigid, spherical rolling ball is placed within the cavity or cavities formed from opposing, recessed composite bearing surfaces, thereby allowing the upper and lower plates to displace relative to one another by rolling on the ball. The spherical bearings are generally made of metal, such as stainless steel, but may be made of any sufficiently rigid material, including a polymer such as a plastic, a hard rubber, and the like. Those of ordinary skill in the art will be aware that a hard, rigid ball, such as a stainless steel ball, making contact with a bearing surface of similar rigidity, will have a minimum of friction.

Alternatively, if a measure of dampening is desired, one or more ball and/or one or more bearing surface may be made to have an increased coefficient of friction (such as with a surface coating of a pliable rubber, plastic or the like; or by making all or part of the ball or bearing surface out of such a dampening material), or by coating the ball with such a dampening material.

As lateral forces (e.g., in the form of seismic vibrations) are applied to a bearing, the upper plate is displaced laterally with respect to the lower plate, such that the rigid ball or balls therebetween roll and rotate freely in any direction and, if sufficiently hard and rigid and lacking in dampening, in an almost frictionless manner about their respective depressions or cavities. The ball or balls permit the bearing to store the energy of the vibration as potential energy by being raised to higher elevations along the bearing surface, such that, the ball(s) remain in contact with the upper and lower plates and the upper and lower plates thus remain indirectly in contact with each other. Due a least in part to the conical, spherical, parabolic, or other raised shapes of the lower and or upper plates' composite bearing surfaces, the gravitational forces acting on the structure, and the structure's mass, produce a lateral force component tending to restore the bearing or platform to its original position, with the upper plate(s) being positioned substantially above the lower plate.

In the event that an outside force is sufficiently strong or long-lasting, or if the bearing or platform lacks sufficient stability, the upper and lower plate of a bearing may be forcefully moved laterally with sufficient force that the ball or sphere may be thrown from the bearing, causing bearing failure. Such an eventuality could obviously be catastrophic for the structure, equipment, or other load borne by the bearing or plurality of bearings comprising the isolation platform or floor, and can be avoided by various means, including, for example, the use of a composite bearing, restraining straps holding the plates or pans together, or a ball restraint device.

The stability of the bearing, floor or isolation platform is increased through the size of its "footprint" (its width versus its height) as compared to the weight distribution of the load. For example, when considering a platform, distances between the apices of a first pan structure (containing, for example, four bearings of the type discussed above) preferably have a ratio of less than 1.25 in relation to the height, width and/or depth of the payload. Additionally, preferably, no more than half of the total weight of the payload is in the upper half of the payload.

Optionally, straps between and linking the upper and lower plates may be attached, thereby allowing lateral displacement between the plates, but preventing unwanted separation of the plates. In addition to, or instead of these straps, one or more isolation bearing restraint, for example those found in Moreno & Hubbard, U.S. Pat. No. 8,342,752, hereby incorporated by reference herein in its entirety, may also be used, thereby freely permitting lateral displacement of the bearing due to the rolling sphere between the plates, but preventing bearing failure due to unwanted separation of the plates and/or separation or ejection of the rolling sphere or spheres themselves from between the upper and lower plates.

BRIEF DESCRIPTION OF THE DRAWINGS

Additional aspects of the present invention will become evident upon reviewing the non-limiting embodiments described in the specification and the claims taken in conjunction with the accompanying figures, wherein:

DETAILED DESCRIPTION OF EXEMPLARY EMBODIMENTS

FIG. 1 has been described above with reference to a ball and cone type rolling ball bearing.

Figure 2:
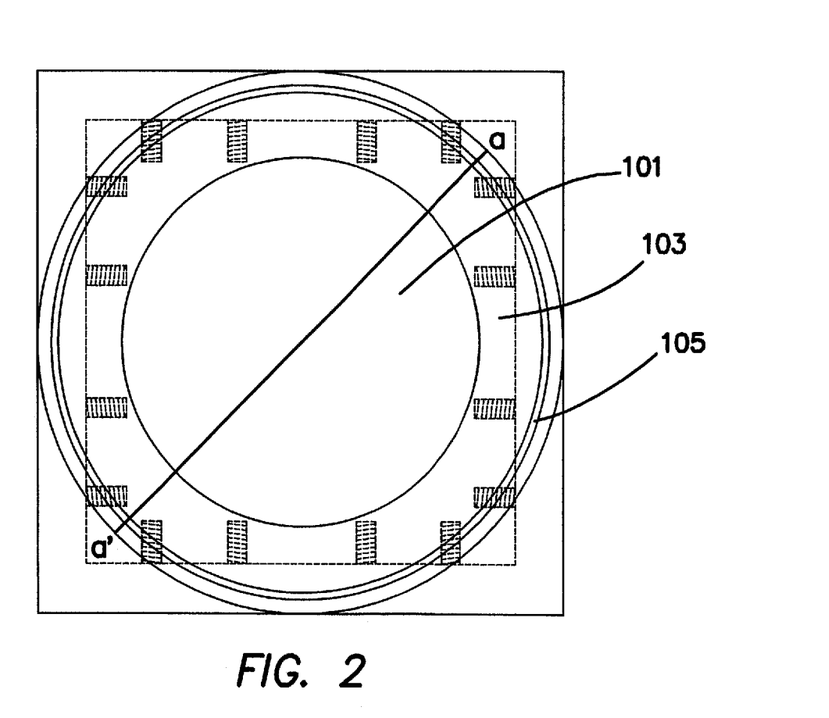
FIG. 2 is a top view of the bearing surface of an embodiment of a composite bearing of the present invention.

FIG. 2 shows a preferred embodiment of the composite bearing of the present invention. In this figure, the load bearing portion of the bearing (or "dish") comprises, in a top view, a substantially circular load-bearing surface having a concentric central region 101 comprising a curved cross-sectional region, such as a spherical curve, and an annular region 103 ringing the central region and comprising a flat, sloped surface linking the central region 101 with a raised lip 105 at the perimeter of the circular load bearing region. Preferably, the central region 101 does not comprise a central dimple for the ball to rest within when the bearing is not subject to shear forces. However, in other embodiments the bearing may contain a central dimple for the ball to rest within when the bearing is at rest.

Still with reference to FIG. 2, in a preferred embodiment, the ratio, in a line segment extending from point a to point a', of the diameter of the central region 101 to the remainder of the load-bearing surface (the annular region 103 and lip region 105), of about 2 to 1. Thus, in a preferred embodiment where the dish is about 30.48 cm (12 inches) in total diameter, a dish having this ratio has a central region diameter of about 20.32 cm (8 inches), with the annular region (which is passed through twice by the line segment) having a width of about 5.08 cm (2 inches). The majority of this annular region (about 4.13 cm (1.625 inches)) is the flat, sloped surface, with the raised lip comprising about 0.95 cm (0.375 inches) of the 5.08 cm (2 inch) annular region.

FIG. 2 shows the perimeter portion of the same embodiment of the composite dish of the present invention in cross-section. As shown, the border 107 between the central, spherically curved region 101 and the flat, sloped portion 103 is shown, with the approximately 4.06 cm (1.6 inch) length of this flat region rising about 0.63 cm (0.25 inches) with a constant slope equaling about 0.25/1.6 or about 0.156. The border 109 between the substantially flat, sloped region 103 of the dish and the lip 105 is shown, with the lip rising in a substantially constant slope. In this embodiment, the slope is: approximately about 0.63 cm (0.25 inches) of vertical rise in approximately 0.32 (0.125 inches) of horizontal length, or approximately 2. The lip becomes horizontal for about 0.63 cm (0.25 inches) before reaching the edge of the plate. In this case, the central, spherically curved region 101 has a radius of curvature of about 218.44 cm (86 inches), meaning it corresponds to an arc of a circle having a radius of about 218.44 cm (86 inches).

Figure 3A:
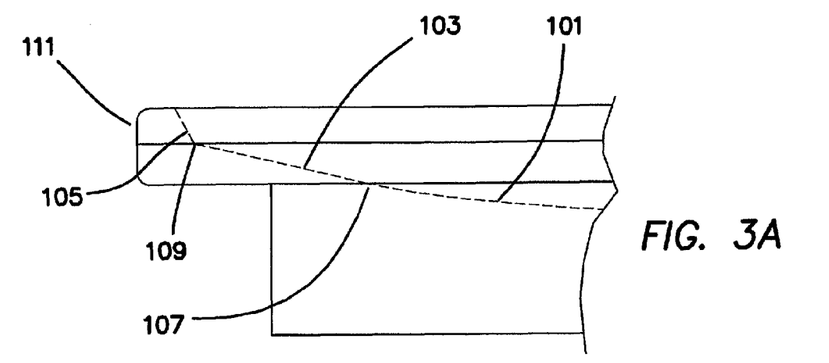
FIG. 3A is a side view of the edge of an embodiment of a composite bearing of the present invention in which the recess defines a line along the surface of the recess comprising a combination of a straight line and a curve.

Those of ordinary skill in the art will immediately recognize based on the foregoing, that the embodiment described above is only one of various possible embodiments of the present invention. Thus, FIG. 3A is a side view of the edge of an embodiment of a composite bearing of the present invention in which the recess defines a line along the surface of the recess comprising a combination of a straight line 103 and a curve 101, as described above.

Figure 3B:
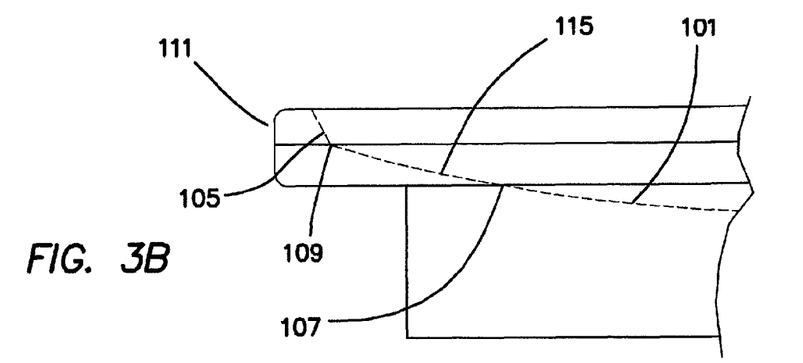
FIG. 3B is a side view of the edge of an embodiment of a composite bearing of the present invention in which the recess defines a line along the surface of the recess comprising a combination of a first curve and a second curve different from the first curve.

FIG. 3B is a side view of the edge of an embodiment of a composite bearing of the present invention in which the recess defines a line along the surface of the recess comprising a combination of a first curve 101 and a second curve 115 different from the first curve.

Figure 3C:
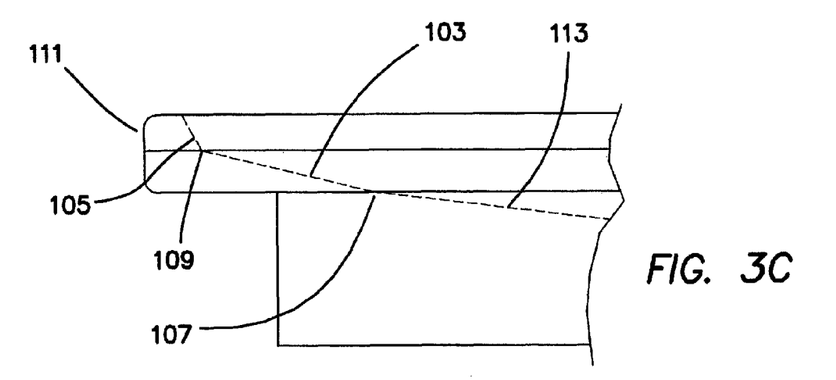
FIG. 3C is a side view of the edge of an embodiment of a composite bearing of the present invention in which the recess defines a line along the surface of the recess comprising a combination of a first straight line and a second straight line having a different slope than said first straight line.

FIG. 3C is a side view of the edge of an embodiment of a composite bearing of the present invention in which the recess defines a line along the surface of the recess comprising a combination of a first straight line 103 and a second straight line 113 having a different slope than said first straight line.

In a particular example, the exact curvature of the central, spherically curved region 101 may be varied (for example, to a parabolic shape) without departing from the spirit of the invention.

It will be recognized, based on this disclosure, that the design of the composition bearing depicted in FIG. 2 and FIG. 3A may serve to provide somewhat greater restoring forces in less violent earthquakes or vibrations. Additionally, the total horizontal displacement will be less than would otherwise be the case with solely a conical load-bearing surface in stronger earthquakes. Where the vibration is strong enough to cause the rolling ball to cross border 107, then the restorative force does not continue to increase as the ball travels up the flat, sloped region 103, thereby helping to prevent excessive rocking of the bearing (or the load placed upon the bearing) when the upper plate seeks to return to equilibrium after the vibration has subsided.

In certain embodiments, the lack of a small central spherically curved dimple or recess also contributes to a more smoothly operating isolation bearing during a strong vibration. Without such a recess the isolation bearing is less likely to fail or be damaged due to harmonic resonance.

Preferably, although not necessarily, opposing dishes in a bearing have substantially identical load-bearing surfaces comprising composite curved and flat angled cross-sectional indentations substantially as described above. Although an isolation bearing typically has a single pair of dishes (recess-containing plates) with a single recess each and a rolling rigid ball between them, in certain embodiments a single dish may be fabricated to have more than one recess. For example, FIG. 2 of U.S. Pat. No. 5,599,106, previously incorporated by reference herein, depicts a single "dish" having four recesses. However, in most applications it may be easier to make and use equipment having multiple plates, each comprising only a single bearing.

Using the composite bearings of the present invention, various apparatus, such as isolation platforms, isolation floors and the like can be fabricated. U.S. Patent Application Publication No. 2006/0260221 is directed at isolation platforms, and U.S. Patent Application Publication No. 2007/0261323 is directed at seismically stable flooring; both of these inventions can benefit from the innovations of the present composite isolation bearing.

Figure 4:
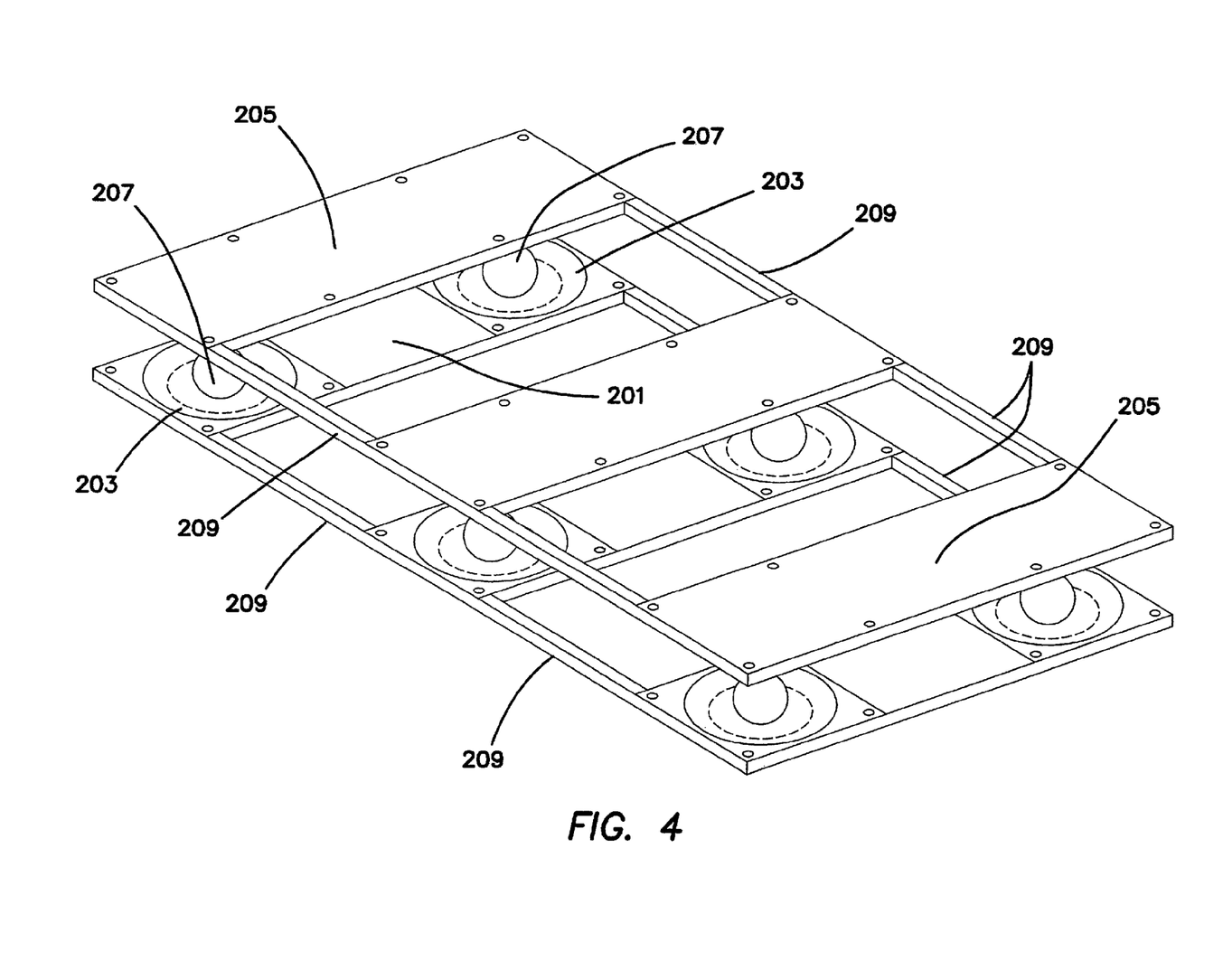
FIG. 4 is an exploded perspective of an extendable isolation platform having composite bearings as shown in FIG. 2 and FIG. 3.

FIG. 4 shows a particularly preferred embodiment of such apparatus, an extendable isolation track can be fabricated using the isolation bearings of the present invention for supporting a payload, such as sensitive computer or laboratory equipment and the like. In such an embodiment the track or isolation platform may comprise at least two linked isolation platforms, such as three linked isolation platforms, each such isolation platform as depicted in exploded form in FIG. 4, comprising:
a) a substantially flat, rectangular and generally planar lower pan segment (201) comprising a first side and a second side opposite said first side having at least two upward facing recesses comprised of a load-bearing material (203);
b) a substantially flat, rectangular and generally planar upper pan segment (205) comprising a first side and a second side opposite said first side having at least two downward facing recesses comprised of a load-bearing material (not shown);
wherein opposing recesses between said lower pan segment and said upper pan segment are aligned to define at least two cavities therebetween, each cavity containing at least one rigid ball (207) rollably supporting the upper pan segment upon the lower pan segment; and wherein each such isolation platform is structured to be linked to at least one additional, substantially identical, isolation platform using a plurality of rigid connecting members (209).

FIG. 4 shows one isolation platform, or isolation platform unit or segment (comprising upper and lower pan structures and rolling ball(s)), linked to two other platforms, units or segments. Those of ordinary skill in the art will understand that each such platform, unit or segment can be linked to at least two other identical platforms units or segments, and thus a "track" can be constructed for providing isolation protection, for example, to a room of computer or delicate equipment.

In particular embodiments of this isolation platform, the recesses are contained within separate bearing plates that are affixed to the upper and lower pan segments using any effective method suitable to withstand the stresses of a seismic event, such as using nuts and bolts, welding to the pan, or by any other sufficiently hardy method of affixing. The pan segments themselves are comprised of a rigid material such as steel, a metal alloy, or a sufficiently rigid and strong polymer having a hardness to resist buckling, twisting and similar stresses expected to be encountered in a seismic event.

In other embodiments, the entire pan may comprise a single plate, with each such plate having a plurality of the compound recesses of the present invention. In this embodiment, therefore, there is no need for bolting, welding, or otherwise affixing plates to the pan, as in other configurations since they are all part of a unified plate. However, this embodiment may be heavier and more expensive to make than a configuration in which the plates are affixed to the pan, as above, and therefore may be of particular advantage when the cost of making such a "single plate" composite bearing is justified by the payload mass or other considerations. Such single plate composite bearings may also be applicable to very large loads such as buildings, bridges, and the like.

As indicated above, in an embodiment of the present invention the isolation platform comprising the composite bearing (s) may comprise two substantially flat, rectangular and generally planar pan segments, each having a first side and a second side opposite said first side having at least two recesses comprised of a load-bearing material and having a combination of cross-sectional shapes, and wherein the recesses of a lower pan surface and an upper pan surface face each other to form at least two cavities with at least one rigid ball rollably supporting the upper pan segment. It will be apparent that when each pan segment has, for example, two cavities, then the isolation platform will tend to be unstable as a single segment. This can be seen in e.g., FIG. 4 when considering only one of the three isolation platforms linked by connecting members 209.

Thus, the isolation platform comprising the composite bearing may be substantially rectangular in shape and comprise two cavities, each such cavity comprising a rigid rolling ball. In such a configuration the isolation platform will generally need to be rigidly and strongly connected, preferably to at least one other isolation platform unit or segment, in order to have sufficient stability to function effectively. Providing a rigid and strong connection to another isolation platform also serves to synchronize the movement of each isolation platform segment when it is subjected to a seismic stress.

It can therefore be seen that in another embodiment the composite bearing of the present invention may be employed in an isolation platform. Thus, for example, another embodiment of the invention may comprise a "track" or extended version of the isolation platform described above with horizontally extending "ties", each such tie comprising the substantially rectangular isolation platform unit or segment having two cavities and a ball within each such cavity comprising a rigid rolling ball, and wherein the ties are preferably arranged parallel to each other and upper and lower pan structures are each connected using one or more rigid connecting member. Preferably, the upper and lower pan surfaces of each tie are each connected using two laterally affixed rigid connecting members.

In response to an external vibration, each of the linked two or more upper plate segments are displaced laterally together with respect to the linked two or more lower plate segments such that the rigid balls between the upper and lower plates roll about their respective bearing surfaces, thereby raising the balls and/or bearing surfaces to a higher elevation, and wherein at least one pair of opposing recesses comprise composite recesses, for example recesses wherein each (or at least one) bearing surface comprises a cross sectional profile having a central, approximately spherically curved region and a annular region comprising a flat, sloped surface.

In particularly preferred embodiments of the invention, the area of the annular region is at least equal to that of the central, approximately spherically curved region. For example the area of the annular region may be equal to, or approximately 1.1 times, or approximately 1.2 times, or approximately 1.3 times, or approximately 1.4 times or approximately 1.5 times, or greater than approximately 1.5 times the area of the central approximately spherically curved region of each load-bearing surface. However, in other embodiments the annular region may have a somewhat smaller are than the central region.

In other embodiments of the present invention, exemplified in the Figures hereof, the depressions and/or cavities in the lower bearing and isolator plates may have varied surfaces defining cavities, recesses, grooves, or combinations of grooves, of various shapes.

Preliminarily, it will be appreciated by one skilled in the art that the following description is of exemplary embodiments only and is not intended to limit the scope, applicability, or various possible configurations of the invention in any way. Rather, the following description merely provides convenient illustrations for implementing various embodiments or alternative configurations of the invention. For example, various changes may be made in the design and arrangement of the elements described in the exemplary embodiments herein without departing from the scope of the invention as set forth in the appended claims.

It will be understood that, in accordance with various embodiments, rather than the conical load bearing surfaces shown in the foregoing examples, each of the plates or pans may comprise a combination of corresponding recessed surfaces, for example, concave, generally conical surfaces, spherical, or parabolic surfaces which create a plurality of conical or spherical or parabolic cavities therebetween. An example of such surfaces can be seen in the figures and disclosure of, e.g., Kemeny, U.S. Patent Publication 2006/0054767, previously incorporated by reference herein as part of the disclosure of this patent application. Generally speaking, it should be appreciated that any suitable combination of radial or linear surfaces may be employed in the context of recesses in accordance with the present invention. In addition, the surfaces may have, for example, a constant continuous slope or a varying continuous slope.

With further particularity in the presently described exemplary embodiment, the downward and upward bearing surfaces may comprise central apices having the same curvature as that of the rigid spherical balls to prevent movement of the apparatus in the event of slight external forces. However, it may be desirable that the apices are shallow, or (in alternate embodiments even absent) so as to prevent resonance and harmonic disturbances when the apparatus is active after a significant vibration. Additionally, the surfaces may have recess perimeters surrounding the bearing surfaces such that the bearing surface connects the central apices and recess perimeters with either continuous (linear or curved) or varying slope. Thus, the curvature of the spherical balls and the downward and upward bearing surfaces are configured such that as the spherical balls and upper and lower plates displace laterally relative to one another, vertical displacement of upper and lower plates is generally less than lateral displacement.

In one example the invention comprises a rolling ball isolation bearing for supporting a payload comprising:
a) a lower plate comprising a first recess comprising a lower bearing surface and having a substantially central depression, and
b) an upper plate upon which at least a portion of the payload is supported comprising a second recess comprising an upper bearing surface and having a substantially central depression, wherein said first and second recess oppose one another to form a cavity, and
c) a rigid rolling ball located within said cavity, said ball having a diameter wider than the combined depth of said first and second recesses and supporting the upper plate upon the load bearing surface of the lower plate;
said rolling ball isolation bearing structured so that if a vibration causes the lower plate to move, the inertia of said payload and upper plate causes said rolling ball to roll upwards from the central depression of the first recess, and wherein a cross-section passing through the center of either or both said first or second recess defines a line along the surface of said recess comprising a combination of shapes selected from the group consisting of:
   i) a straight line and a curve,
   ii) a first curve and a second curve different from the first curve, and
a first straight line and a second straight line having a different slope than said first straight line.

In another example, the invention comprises an extendable isolation track comprising at least two linked isolation platforms, each such isolation platform comprising:
a) a substantially flat, rectangular and generally planar lower pan segment comprising a first side and a second side opposite said first side having at least two upward facing recesses;
b) a substantially flat, rectangular and generally planar upper pan segment comprising a first side and a second side opposite said first side having at least two downward-facing recesses structured to oppose said upward-facing recesses;
wherein said opposing recesses are aligned to define at least two cavities therebetween, each cavity containing at least one rigid ball rollably supporting the upper pan segment upon the lower pan segment;
wherein a cross-section passing through the center of at least one recess defines a line along the surface of said recess comprising a combination of shapes selected from the group consisting of:
   i) a straight line and a curve,
   ii) a first curve and a second curve different from the first curve, and
   iii) a first straight line and a second straight line having a different slope than said first straight line,
and wherein each such isolation platform is structured to be linked to at least one additional, substantially identical, isolation platform using a plurality of rigid connecting members linking contiguous upper pan segments and contiguous lower pan segments.

In another example, the invention comprises a method of optimizing the capacity of an isolation bearing having a load-bearing surface of a given area to protect a payload supported thereby from damage due to a seismic vibration comprising combining an approximately spherical central portion of said load-bearing surface with an annular region of said load-bearing surface having a substantially constant slope.

Although the foregoing invention has been described in detail for purposes of clarity of understanding, it will be obvious that certain modifications may be practiced within the scope of the appended claims. Additionally, features illustrated herein as being present in a particular embodiment are intended, in aspects of the present invention, to be combinable with features not otherwise illustrated in this patent application as being present in that particular embodiment. All publications and patent documents cited herein are hereby incorporated by reference in their entirety for all purposes to the same extent as if each were so individually denoted.

We claim:
1. A rolling ball isolation bearing for supporting a payload comprising:
   a) a lower plate comprising a first recess, said first recess comprising a lower bearing surface, having a first maximum depth, and having a substantially central depression, and b) an upper plate, upon which at least a portion of the payload is supported, comprising a second recess, said second recess comprising an upper bearing surface having a second maximum depth, and having a substantially central depression, wherein said first and second recess oppose one another to form a cavity, and c) a rigid rolling ball located within said cavity, said rolling ball having a diameter wider than the combined first maximum depth and second maximum depth of said first recess and said second recess and supporting the upper plate upon the load bearing surface of the lower plate;

said rolling ball isolation bearing structured so that a vibration causes the lower plate to move an inertia of said payload and upper plate causes said rolling ball to roll upwards from the central depression of the first recess, and wherein a cross-section passing through the center of at least one of said first recess or said second recess defines a line along the surface of said at least one of said first recess or said second recess comprising a shape selected from the group consisting of:

i) a straight line and a curve, ii) a first curve and a second curve different from the first curve, and iii) a first straight line and a second straight line having a different slope than said first straight line.

2. The isolation bearing of claim 1 wherein at least one of said first and said second recess is at least partially conical in shape.

3. The isolation bearing of claim 1 wherein at least one of said first and second recess is at least partially spherical in shape.

4. The isolation bearing of claim 1 wherein at least one of said first and second recess has a shape comprising a combination of conical and spherical shapes.

5. The isolation bearing of claim 4 in which the cross-sectional shape of said at least one recess has a central approximately spherically curved region and an annular region comprising a flat, sloped surface.

6. The isolation bearing of claim 5 in which an area of the annular region is at least equal to that of the central, approximately spherical region.

7. The isolation bearing of claim 5 in which the flat sloped surface has a ratio of vertical rise to horizontal length of approximately 2.

8. The isolation bearing of claim 5 in which the central, spherically curved region has a radius of curvature of about 218.44 cm (86 inches).

9. The isolation bearing of claim 1 in which the central curved region has a parabolic shape.

10. An extendable isolation track comprising at least two linked isolation platforms, each said isolation platform comprising:

a) a substantially flat, rectangular and generally planar lower pan segment comprising a first side and a second side opposite said first side, said second side having at least two upward facing recesses;

b) a substantially flat, rectangular and generally planar upper pan segment comprising a first side and a second side opposite said first side, said second side having at least two downward-facing recesses structured to oppose said upward-facing recesses;

wherein said opposing recesses are aligned to define at least two cavities therebetween, each cavity containing at least one rigid ball rollably supporting the upper pan segment upon the lower pan segment;

wherein a cross-section passing through the center of at least one recess defines a line along the surface of said recess comprising a combination of shapes selected from the group consisting of:

i) a straight line and a curve, ii) a first curve and a second curve different from the first curve, and iii) a first straight line and a second straight line having a different slope than said first straight line, and wherein each said isolation platform is structured to be linked to at least one additional, substantially identical, isolation platform using a plurality of rigid connecting members linking contiguous upper pan segments and contiguous lower pan segments.

11. The isolation track of claim 10 wherein at least two connecting members are laterally disposed.

12. The isolation track of claim 10 wherein a first connecting member links said two linked isolation platforms along a first side of each said isolation platform and a second connecting member links said two linked isolation platforms along a second side of each said linked isolation platform.

13. The isolation track of claim 10 comprising at least one isolation platform linked by a plurality of connecting members to at least two additional isolation platforms.

14. The isolation track of claim 10 wherein the cross-sectional shape of said at least one recess has a central, approximately spherically curved region and an annular region comprising a flat, sloped surface.

15. The isolation track of claim 14 in which an area of the annular region is at least equal to that of the central, approximately spherical region.

16. The isolation track of claim 14 in which the flat sloped surface has a ratio of vertical rise to horizontal length of approximately 2.

17. The isolation track of claim 14 in which the central, spherically curved region has a radius of curvature of about 218.44 cm (86 inches).

18. The isolation track of claim 10 in which a payload supported by said isolation platform is computer equipment.

19. The isolation track of claim 10 in which a gap between isolation platforms permits access to power or data cables.

* * * * *